(12) United States Patent  (10) Patent No.: US 7,788,470 B1
Purcell et al.  (45) Date of Patent: Aug. 31, 2010

(54) SHADOW PIPELINE IN AN AUXILIARY PROCESSOR UNIT CONTROLLER

(75) Inventors: Kathryn S. Purcell, Mountain View, CA (US); Ahmad R. Ansari, San Jose, CA (US); Gaurav Gupta, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 355 days.

(21) Appl. No.: 12/057,353

(22) Filed: Mar. 27, 2008

(51) Int. Cl.
*G06F 9/00* (2006.01)

(52) U.S. Cl. ....................................... 712/34
(58) Field of Classification Search ........................ None
See application file for complete search history.

(56) References Cited

U.S. PATENT DOCUMENTS

| | | | | |
|---|---|---|---|---|
| 5,504,912 A | * | 4/1996 | Morinaga et al. | 712/34 |
| 5,860,000 A | * | 1/1999 | Biswas et al. | 712/244 |
| 6,237,079 B1 | * | 5/2001 | Stoney | 712/34 |

(Continued)

OTHER PUBLICATIONS

U.S. Appl. No. 10/912,844, filed Aug. 6, 2004, Ansari, Ahmad R., et al., entitled "Coprocessor Interface Controller", Xilinx, Inc. 2100 Logic Drive, San Jose, California 95124.

(Continued)

*Primary Examiner*—Eddie P Chan
*Assistant Examiner*—Keith Vicary
(74) *Attorney, Agent, or Firm*—W. Eric Webostad; Thomas George

(57) ABSTRACT

A method and controller for supporting out of order execution of instructions is described. A microprocessor is coupled to a coprocessor via a controller. Instructions are received by the microprocessor and the controller. Indices respectively associated with the instructions are generated by the microprocessor, and the instructions are popped from the first queue for execution by the coprocessor. The controller includes a first queue and a second queue. The instructions and the indices are queued in the first queue, and this first queuing includes steering the instructions and the indices associated therewith to respective first register locations while maintaining association between the instructions and the indices. The instructions may be popped off the first queue out of order with respect to an order in which the instructions are received into the first queue.

16 Claims, 11 Drawing Sheets

U.S. PATENT DOCUMENTS

| | | | | |
|---|---|---|---|---|
| 6,477,638 | B1 * | 11/2002 | Gearty et al. | 712/220 |
| 6,542,983 | B1 * | 4/2003 | Gearty et al. | 712/212 |
| 6,754,804 | B1 * | 6/2004 | Hudepohl et al. | 712/34 |
| 6,782,445 | B1 * | 8/2004 | Olgiati et al. | 711/100 |
| 6,886,092 | B1 * | 4/2005 | Douglass et al. | 712/37 |
| 7,243,212 | B1 * | 7/2007 | Purcell et al. | 712/34 |
| 7,346,759 | B1 * | 3/2008 | Ansari et al. | 712/34 |
| 7,546,441 | B1 * | 6/2009 | Ansari et al. | 712/220 |
| 7,590,822 | B1 * | 9/2009 | Purcell et al. | 712/34 |
| 7,590,823 | B1 * | 9/2009 | Ansari et al. | 712/34 |
| 2002/0133689 | A1 * | 9/2002 | Park et al. | 712/34 |
| 2003/0062922 | A1 * | 4/2003 | Douglass et al. | 326/39 |
| 2003/0188127 | A1 * | 10/2003 | So | 712/34 |
| 2004/0044878 | A1 * | 3/2004 | Evans et al. | 712/34 |
| 2004/0193852 | A1 * | 9/2004 | Johnson | 712/226 |
| 2005/0055594 | A1 * | 3/2005 | Doering et al. | 713/375 |
| 2005/0268072 | A1 * | 12/2005 | Najam et al. | 712/34 |
| 2008/0059765 | A1 * | 3/2008 | Svendsen et al. | 712/34 |
| 2008/0059771 | A1 * | 3/2008 | Svendsen et al. | 712/218 |

OTHER PUBLICATIONS

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.

UG200 (v1.0), "Embedded Processor Block in Virtex-5 FPGAs", Jan. 15, 2008, 323 pages, Xilinx, Inc. 2100 Logic Drive, San Jose, CA 95124.

UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

SHADOW PIPELINE IN AN AUXILIARY PROCESSOR UNIT CONTROLLER

FIELD OF THE INVENTION

The invention relates to integrated circuit devices (ICs). More particularly, the invention relates to a shadow pipeline in an auxiliary processor unit controller for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), may include an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect may include a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are conventionally programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration (programming) sequence.

For all of these PLDs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Microprocessors are being embedded in Application Specific Integrated Circuits ("ASICs"), Application Specific Standard Products ("ASSPs"), and System-On-Chips ("SoCs"). These SOCs may be PLDs, such as FPGAs, that may contain one or more embedded microprocessors. Applications run exclusively on an embedded processor ties up the processor and thus does not have the advantage of off-loading tasks to a coprocessor. Alternatively, a coprocessor unit may be implemented in FPGA programmable resources ("FPGA fabric") and coupled to an embedded microprocessor for off-loading tasks to the coprocessor. The term "coprocessor" as used herein means a coprocessor instantiated in whole or in part in programmable logic resources.

A conventional microprocessor core embedded in dedicated hardware of an FPGA may include multiple pipelines. These pipelines may be relatively independent from one another. For example, one pipeline may be for executing an instruction and another pipeline may be for accessing data from cache. An auxiliary processor unit ("APU") controller may be coupled to a pipeline of such an embedded microprocessor. An example of an APU controller is described in U.S. Pat. No. 7,243,212 B1, which is incorporated by reference herein in its entirety for all purposes.

Heretofore, an APU controller executed one instruction at a time in order. Thus, an instruction provided to a microprocessor targeted for an auxiliary coprocessor coupled via an APU controller had to be completely executed by both the coprocessor and the APU controller before another instruction for such coprocessor could be passed to the APU controller for execution by the coprocessor. Thus, back-to-back APU instructions provided to a microprocessor meant that the latter of such instructions would be stalled until complete execution of the earlier of such instructions. This stalling of the microprocessor occurred even if the subsequent instruction of such instructions was for processing via a different pipeline of such microprocessor than the earlier of such instructions. Accordingly, back-to-back transactions could not be processed without at least one wait state, namely at least one "dead" microprocessor system clock cycle, between such transactions.

Moreover, heretofore out-of-order execution was not supported. Thus, even if a microprocessor having multiple pipelines supported out-of-order execution, out-of-order execution of instructions provided to an APU controller was not supported, namely would stall the microprocessor.

SUMMARY OF THE INVENTION

One or more aspects of the invention generally relate to a shadow pipeline in an auxiliary processor unit controller for an IC.

An aspect relates generally to a method for supporting out of order execution of instructions, including: having a microprocessor coupled to a coprocessor via a controller; receiving instructions by the microprocessor and the controller; generating by the microprocessor indices respectively associated with the instructions; and popping the instructions from the first queue for execution by the coprocessor. The controller includes a first queue and a second queue. The instructions and the indices are queued in the first queue, and this first queuing including steering the instructions and the indices associated therewith to respective first register locations while maintaining association between the instructions and the indices. The instructions may be popped off the first queue out of order with respect to an order in which the instructions are received into the first queue.

Another aspect relates generally to a controller for bridging a microprocessor and a coprocessor. The controller includes: a first queue and a second queue for receiving instructions provided to the microprocessor and for receiving indices generated by the microprocessor for the instructions received. The first queue under state machine control is configured to: steer the instructions and the indices associated therewith to respective first register locations while maintaining association between the instructions and the indices; pop the instructions from the first queue for execution by the coprocessor; and support the instructions being popped off the first queue out of order with respect to an order in which the instructions are received into the first queue.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
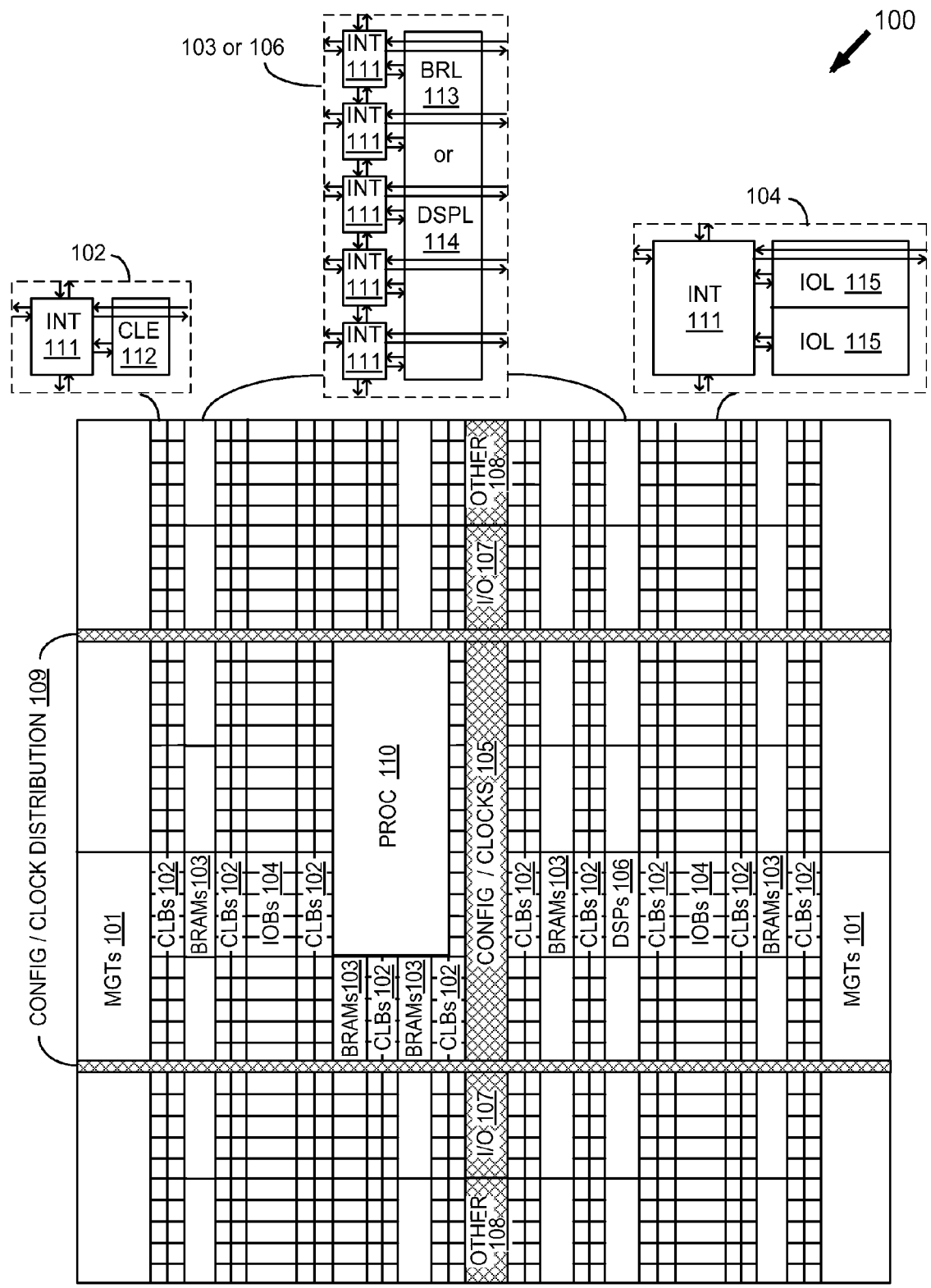
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text or data that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5 FPGA available from Xilinx, Inc. of San Jose, Calif., can be programmed to incorporate pre-developed logic blocks with pre-designed functionalities, i.e., "soft cores". A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream.

Moreover, a hardwired core (or "hard core"), such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings or other storage.

As described below in additional detail, a shadow pipeline for a microprocessor allows an APU controller to capture multiple instructions along with their corresponding data. As instructions enter pipelines of a microprocessor, such instructions may also enter an APU shadow pipeline. For purposes of clarity by way of example, it shall be assumed that the embedded processor in an FPGA is used. Such an embedded processor may be a PowerPC 440 core processor. However, it should be appreciated that other types of processors may be used provided such processors have more than one pipeline for processing instructions. Furthermore, it should be appreciated that an APU controller may be used with an embedded microprocessor or a stand alone microprocessor, and with respect to the former, such embedded processor may be embedded in any integrated circuit chip, including an FPGA.

Independently of a pipeline of an embedded microprocessor, instructions may flow through an APU shadow pipeline for execution in a device coupled to an APU controller. For purposes of clarity by way of example and not limitation, it shall be assumed that the device coupled to such APU controller is a coprocessor which is instantiated in programmable logic resources ("fabric") of FPGA 100. Thus, it shall be assumed that instructions are executed by a "fabric coprocessor". Even though the example of a coprocessor is used, it should be understood that any device capable of executing instructions and instantiated in whole or in part in FPGA fabric may be used. Accordingly, such APU controller bridges a master device, such as a microprocessor, and a slave device, such as a coprocessor.

As described below in additional detail, multiple instructions may be queued up in such an APU shadow pipeline. This queuing of multiple instructions allows for back-to-back transitions on a fabric interface, such as an interface between an APU controller and a fabric coprocessor, without having to have at least one dead cycle present between such transactions.

Figure 2:
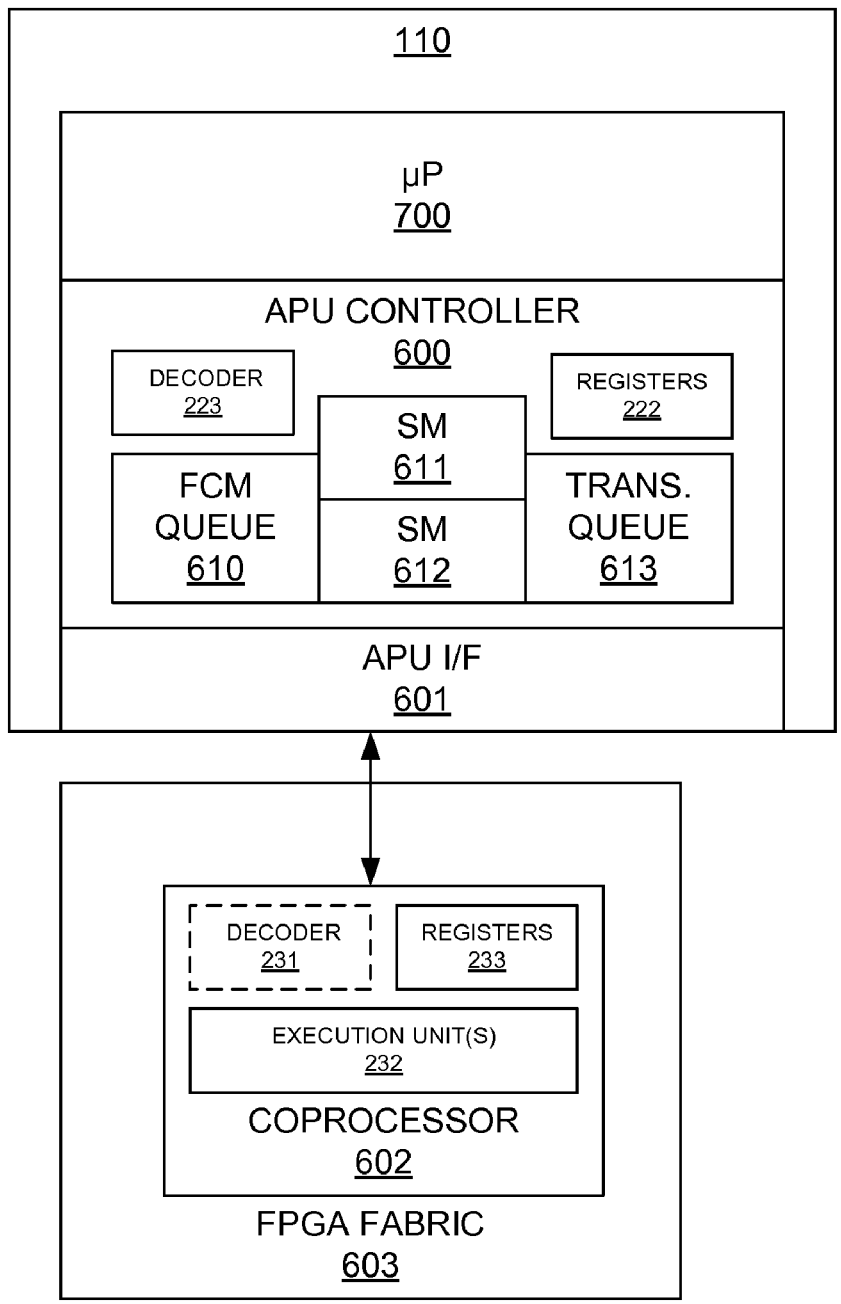
FIG. 2 is a block diagram depicting an exemplary embodiment of an FPGA having a processor block coupled to a coprocessor.

FIG. 2 is a block diagram depicting an exemplary embodiment of an FPGA 100 having processor block 110 coupled to a "soft" coprocessor 602 instantiated in FPGA fabric 603. More particularly, processor block 110 includes microprocessor 700, APU controller 600, and APU interface 601. Microprocessor 700, APU controller 600, and APU interface 601 may all be implemented using hardwired or dedicated circuitry in contrast to programmable logic of FPGA fabric 603 which is used to instantiate coprocessor 602.

Microprocessor 700 may receive instructions. While microprocessor 700 may receive such instructions in an order, such instructions may or may not be executed in the order in which they are received. In other words, microprocessor 700 may execute instructions in or out of order.

As described below in additional detail with reference to FIGS. 3 through 7, APU controller 600 may be configured to queue instructions, namely instructions targeted for coprocessor 602 in this example, or more generally any APU instructions such as for providing one at a time to APU interface 601. Such queued instructions by APU controller 600 may be provided one at a time to APU interface 601 in order of their receipt, where a next instruction is provided after completion of the immediately prior instruction. After coprocessor 602, in this example embodiment, has executed such instruction, the result is provided back to APU interface 601.

As soon as one APU instruction is completed, APU interface 601 may send another APU instruction to coprocessor 602, such as another APU instruction queued up and ready to send. Because of this queuing of instructions between microprocessor 700 and coprocessor 602, communications with microprocessor 700 for execution of queued instructions may take place while executing a current instruction.

Microprocessor 700 may have multiple pipelines that are capable of performing operations in parallel. By queuing APU instructions, stalling one or more pipelines of microprocessor 700, while waiting for execution by coprocessor 602 may in some instances be avoided. However, it should be appreciated that if an instruction in a pipeline is dependent upon the outcome of execution of another APU instruction, then such pipeline may still be stalled waiting for the outcome of execution of such an APU instruction by coprocessor 602.

Figure 3:
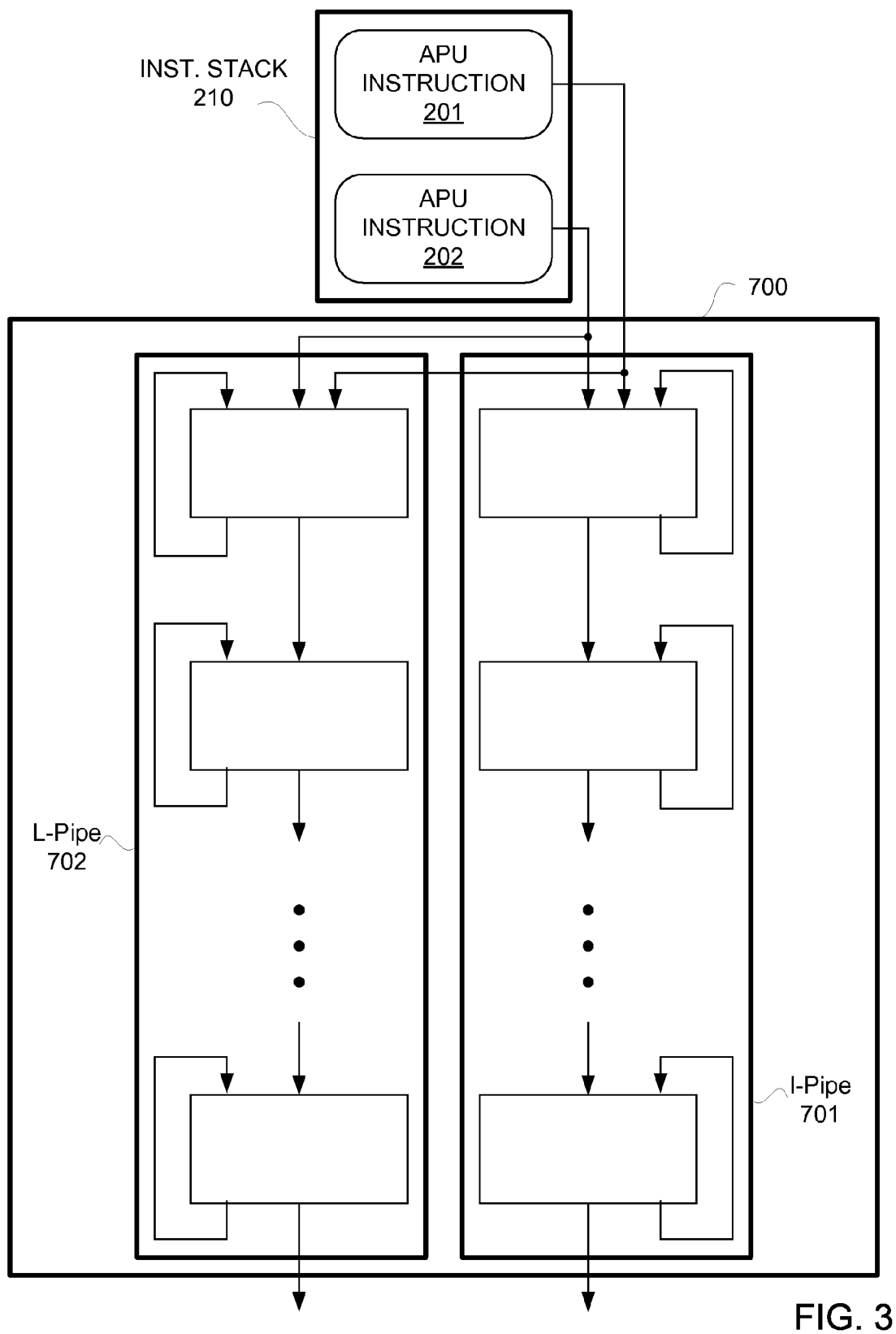
FIG. 3 is a block diagram depicting an exemplary embodiment of microprocessor having pipelines.

FIG. 3 is a block diagram depicting an exemplary embodiment of microprocessor 700 having pipelines 701 and 702. An instruction stack 210 may store one or more instructions which may be provided to pipelines 701 or 702 of microprocessor 700. For example, APU instruction 201 may be provided to pipeline 701 and APU instruction 202 may be provided to pipeline 702. Thus, APU instructions may be parallel piped through microprocessor 700.

In an exemplary embodiment described herein, a PowerPC 440 core is used. The PowerPC 440 core available from IBM is a dual issue out-of-order superscalar microprocessor having seven pipeline stages associated with three execution pipelines. The three execution pipelines are a complex integer pipeline, namely an I-pipe, a simple integer pipeline, namely a J-pipe, and a load/store pipeline, namely an L-pipe. The seven pipeline stages are an instruction fetch stage, a pre-decode stage, a decode and issue stage, a register access stage, an address generation/execution stage, a cache read/execution stage, and writeback stage.

For a PowerPC 440 core, microprocessor 700 determines whether all previous instructions have confirmed before allowing an instruction to commit. An instruction being allowed to commit means such an instruction will be allowed to finish or complete. Instructions within the same pipeline execute in order, but between pipelines instructions may execute out of order. However, all instructions commit in order. Once an instruction is committed, such instruction may be completed in or out of order with respect to another instruction. APU instructions generally will execute in order, but once committed may complete out of order. Generally, an instruction fetch stage precedes a pre-decode stage which precedes a decode and issue stage. Following the decode and issue stage may be a register access stage, followed in sequence by an execute/address generation stage, an execute/cache read stage, and a writeback stage. The decode and issue stage through the writeback stage may be coupled to APU controller 600.

With respect to the decode and issue stage, which may be mirrored in APU controller 600, such a decode and issue stage may include a decode and issue queue that queues up pre-decoded instructions to allow two instructions per clock cycle to be input to pipelines of a PowerPC 440 core microprocessor. Thus, for example a decode and issue queue ("DISS0") register bank and a ("DISS1") register bank of microprocessor 700 may have queued instructions for pipelines thereof.

On a microprocessor side of APU controller 600, such APU controller 600 may be coupled to pipelines of microprocessor 700. Additionally, APU controller 600 may include a decoder 223 and registers 222 for decoding registered user defined instructions ("UDIs"), as well as for decoding other received instructions. On a fabric coprocessor module ("FCM") side of APU controller 600, such APU controller 600 may be coupled to registers 233 of coprocessor 602 as well as to one or more execution units 232 thereof. Additionally, coprocessor 602 may include an optional decoder 231. For PowerPC, Ra and Rb fields are used to specify operand registers, and an Rt field is used to specify a target register. Some details of the interfacing between microprocessor 700 and APU controller 600, as well as between coprocessor 602 and APU controller 600 is described in the above-referenced patent, which is incorporated herein by reference in its entirety.

APU controller 600 may be configured to decode up to two FCM instructions in the same clock cycle. Thus, two instructions may be input to APU controller 600 in the same clock cycle as instructions are input to microprocessor 700. APU controller 600 may decode such instructions in order to notify microprocessor 700 what resources the instructions are going to use. For example if an instruction is a load, APU controller 600 may notify microprocessor 700 of the transfer size and any source data to be used for the load. More generally, a PowerPC processor may use both primary and extended op-codes to identify potential instructions for an FCM, namely potential APU instructions.

Load and store instructions for an FCM, such as coprocessor 602, allow data transfer between a memory system associated with microprocessor 700 and coprocessor 602. Microprocessor 700 may handle address calculation and pass data to and from memory for this communication. An FCM may load transferred data from a memory location to a destination register in such FCM, and vice versa for an FCM store operation. In addition to storage instructions, such as loads and stores, an FCM may have non-storage instructions.

Non-storage instructions for an FCM have more flexibility with respect to op-codes and the function of such op-codes than microprocessor storage instructions. If an FCM load/store instruction is flushed from a microprocessor pipeline, APU controller 600 may notify the FCM by sending it a flush signal. APU controller 600 may provide a signal indicating when an FCM load instruction may no longer be flushed and may safely update internal registers 233 of such FCM. When a next load instruction and all data for such load instruction are ready in a queue of APU controller 600 to be sent to an FCM, a ready signal may be asserted by APU controller 600. This ready signal may be used to improve instruction throughput for load instructions.

In other words, as soon as APU controller 600 receives a done signal from an FCM indicating a current instruction has completed, a next instruction which is a load instruction having all data ready for such load instruction may be sent on the very next FCM clock cycle. As described below in additional detail, this allows for back-to-back execution of instructions with zero microprocessor system clock cycle latency therebetween. Because an FCM knows when a next instruction may arrive, an FCM may be configured to assert a done signal during the same clock cycle when it knows an FCM instruction may be received. This allows for a load instruction to be sent and a previous instruction completed all in one FCM clock cycle.

Generally, there are two types of store instructions, namely those using a writeback okay signal and those not using a writeback okay signal. Stores without a writeback okay signal may have better performance. A store instruction ("store") that does not use a writeback okay signal, namely does not wait for a writeback okay signal, does not have any resource in an FCM that is updated based on such a store completing. A store that waits for a writeback okay signal either has at least one resource in an FCM that is updated when the store completes or the FCM may have a different endian address than memory. A different endian address means waiting for an endian signal associated therewith. An FCM may receive a writeback okay signal and in response in the same clock cycle or in a subsequent clock cycle indicate that the store data bus is valid. The term bus as used herein means a group of signals.

There are three categories of non-storage user defined instructions, namely autonomous instructions, non-autonomous early-confirming instructions, and non-autonomous late-confirming instructions. Autonomous instructions do not stall a pipeline of a microprocessor. Such autonomous instructions are "fire-and-forget" instructions that do not return any result data or condition record bits to a microprocessor. APU controller 600 may be configured to automatically confirm to microprocessor 700 that an autonomous instruction will not cause an exception, and an FCM may receive a writeback okay signal immediately when an instruction cannot be flushed from a microprocessor pipeline. An example of an autonomous instruction may be an instruction that reads contents of one or more general purpose registers of a microprocessor without returning any data to the microprocessor.

A non-autonomous instruction may stall normal execution in a microprocessor pipeline until an FCM instruction is completed. Non-autonomous instructions may return result data or status, such as condition record bits, to a microprocessor. APU controller 600 may wait for an FCM to confirm that a non-autonomous instruction will not cause an exception with respect to late confirmation, to allow an FCM, such as coprocessor 602, to issue an exception. A non-autonomous instruction with early confirmation allows APU controller 600 to automatically confirm to microprocessor 700 that such an instruction will not cause an exception.

Non-storage instructions may be used to source data from general purpose registers in microprocessor 700, send result data to general purpose registers in microprocessor 700, update condition record bits in microprocessor 700, or a combination thereof. As described below in additional detail, in an embodiment an APU controller 600 may be configured to accept up to three FCM instructions at a time. By allowing APU controller 600 to accept more than one instruction at a time, APU controller 600 may be allowed for example to finish a first FCM instruction at the same time it receives source data for a second and even a third FCM instruction in the exemplary embodiment. Accordingly, the second FCM instruction may have all of its source data ready to send prior to or at the time of completion of the first FCM instruction, allowing overlapping of overhead by starting of the second and third FCM instructions in microprocessor pipelines.

Even though only two APU instructions 201 and 202 are illustratively shown in instruction stack 210, it should be appreciated that more than two APU instructions 201 and 202 may be stacked in instruction stack 210. Instructions which are not for coprocessor 602, but which are for execution by microprocessor 700 may be in instruction stack 210, but are not shown here for purposes of clarity and not limitation. APU instructions 201 and 202 are received in order, where APU instruction 201 is received first, and APU instructions 201 and 202 are provided in order to microprocessor 700 and to APU controller 600. Along those lines, APU controller 600 may include FCM queue 610 and transaction queue 613. Exemplary embodiments of such queues 610 and 613 are described with reference to FIGS. 4 through 7 and 8 through 11, respectively.

Figure 4:
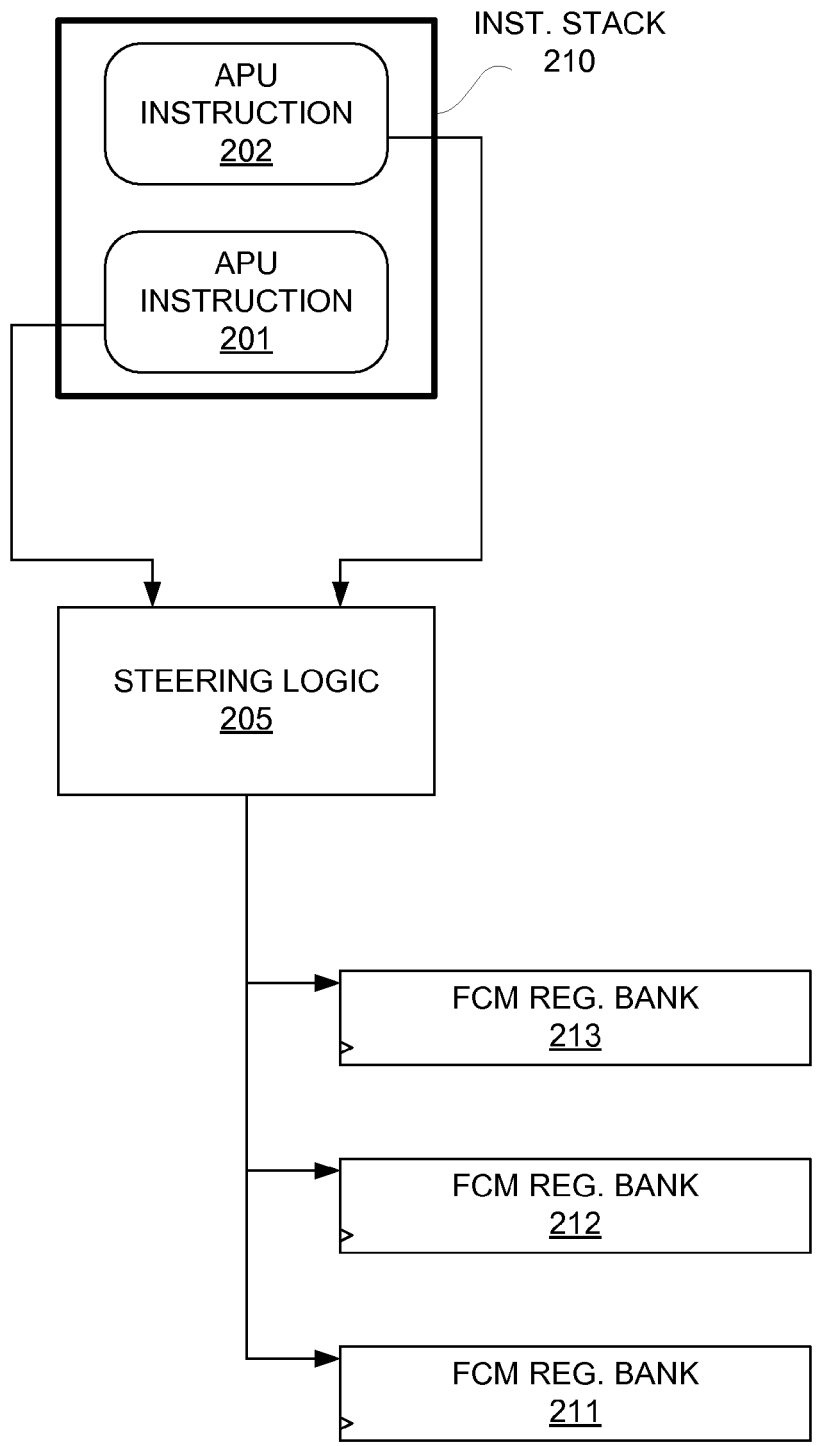
FIG. 4 is a block diagram depicting an exemplary embodiment of an instruction queue of a fabric coprocessor module queue of FIG. 2.

FIG. 4 is a block diagram depicting an exemplary embodiment of a portion of an FCM queue 610, namely instruction queue 200. APU instructions 201 and 202 are decoded by APU controller 600, and such decoded instructions each may enter instruction queue 200 in order generally at about the same, if not the same time, that such instructions enter microprocessor 700. APU instructions 201 and 202 are presented to steering logic 205 in the order in which they are received and processed by steering logic 205 in the order in which they are received. Steering logic 205 is coupled to banks of registers, namely FCM register banks 211 through 213.

Register banks 211 through 213 may have associated therewith an order. Thus for example, register bank 211 may be a lower order than register bank 212, and register bank 212 may be a lower order than register bank 213. Steering logic 205 is configured to place each APU instruction in the order in which it is received in the lowest order available register bank of registers banks 211 through 213.

In the exemplary embodiment of FIG. 2, three instructions are capable of being respectively stored at a time in register banks 211 through 213. Additionally, stored with such instructions are any decoded signals associated therewith as well as any data which is to be provided to a target device, such as coprocessor 602, as part of execution of such instruction. So by way of example and not limitation, if APU instruction 201 is stored in register bank 211, then register bank 211 is the lowest order of the available register banks. However, if register banks 211 and 212 are full with respective prior APU instructions, then APU instruction 201 would be stored in register bank 213. Thus it should be appreciated that register banks 211 through 213 are ordered to the sequence of instructions stored therein, namely the order in which such instructions are received by instruction queue 200. While an instruction enters instruction queue 200 in order, such an instruction may not necessarily exit instruction queue 200 in order.

In FIG. 3, APU instruction 201 and APU instruction 202 may enter microprocessor 700 during a same clock cycle, where one of the APU instructions goes to one pipeline of microprocessor 700 and the other of the APU instructions goes to another pipeline of microprocessor 700. APU controller 600 tracks such APU instructions 201 and 202 as they proceed down for example pipelines 701 and 702. Again, as previously described such APU instructions 201 and 202 are likewise provided in order to steering logic 205 of instruction queue 200, which is part of APU controller 600. So after APU controller 600 decodes APU instructions 201 and 202, such instructions are provided in order to steering logic 205 for respectively storing in the lowest order available register bank, as previously described.

Stack instructions in FCM register banks 211 through 213 may allow for back-to-back execution of instructions, namely instructions which are executed without any "dead" cycle ("bubble") between execution of APU instructions 201 and 202 for example. Thus, while APU instruction 201 is being executed all of the queuing for APU instruction 202 may be completed before execution of APU instruction 201 is complete. Once APU instruction 201 is completed by coprocessor 602, execution of APU instruction 202 may begin without a dead cycle between the two transactions.

Instruction queue 200 forms a part of a shadow pipeline of APU controller 600 that shadows pipelining in microprocessor 700. This shadow pipeline of APU controller 600 of FIG. 6 uses queues 610 and 613. Thus as previously described, as instructions enter microprocessor 700, and more particularly pipelines of microprocessor 700, such instructions may also enter an APU controller shadow pipeline. Independently of microprocessor 700, such instructions may flow into such an APU shadow pipeline in receipt order and flow out of such APU shadow pipeline in the receipt order or a different order, namely the order of execution by coprocessor 602.

Continuing the above example, APU controller 600 may be configured for pipelining up to three instructions. This pipelining uses separate parallel queues along with pipeline tracking of pipelines 701 and 702. For a PowerPC embodiment, pipeline 701 may be an instruction pipeline ("I-pipe") and pipeline 702 may be a load/store pipeline ("L-pipe"). An L-pipe 702 executes all loads and stores provided to microprocessor 700. All other instructions, namely all other instructions which are neither a load nor a store may be executed by I-pipe 701. APU controller 600 is configured to track APU instructions as they proceed down either or both L-pipe 702 or I-pipe 701. Instruction queue 200 may track such instructions and their data only to APU interface 601. APU controller 600 may use signals from APU controller decode logic along with hold signals from microprocessor 700 and coprocessor 602 to track the flow of an instruction through pipelines, such as I-pipe 701 and L-pipe 702.

With respect to instruction queue 200, instructions may exit in one of several ways. If an instruction is a first instruction in instruction queue 200, such instruction may exit when a transaction associated therewith is completed by coprocessor 602. Such completion may be indicated by receiving a done signal from coprocessor 602 or when APU controller 600 sends a flush signal to coprocessor 602. If an instruction is the second or third instruction in instruction queue 200, such instruction may exit because of a flush of a pipeline associated therewith in microprocessor 700, a branch miss prediction, or an exception generated by coprocessor 602. If an instruction exits the FCM queue from the second or third position, the instruction will not be sent to the fabric coprocessor for execution.

As instructions exit instruction queue 200, remaining instructions flow down. For example suppose there are three instructions which are received in sequence as instruction 1, instruction 2, and instruction 3. Thus, when instruction 1 exits, instruction 2 moves to a stage of processing associated with instruction 1, and instruction 3 moves to a stage of processing associated with instruction 2, and thus a new instruction may enter into the stage previously held by instruction 3. More particularly, if instructions 1 through 3 are respectively stored in FCM register banks 211 through 213, then once FCM register bank 211 is available FCM register bank 212 takes its place with respect to the stage of processing. Again, if all FCM register banks 211 through 213 are empty, then instruction 1 always enters into a lowest order stage.

APU 600 may include a state machine 611 which is configured to track the number of instructions currently in FCM queue 610. Queued information, such as APU instructions, indices, writeback okay signals, decoded signals, and source data for example, may use state machine 611, along with other inputs (not described for purposes of clarity and not limitation) to track data in FCM queue 610. Continuing the example of a PowerPC exemplary embodiment, CS indices as associated therewith are described though other types of indices may be used.

As each APU instruction, such as APU instructions 201 and 202, enters FCM queue 610, such instruction, and all decoded information associated therewith, as well as an index number for the instruction may be registered in FCM queue 610. Thus, APU instructions, such as APU instructions 201 and 202, are registered in instruction queue 200 as previously described.

Figure 5:
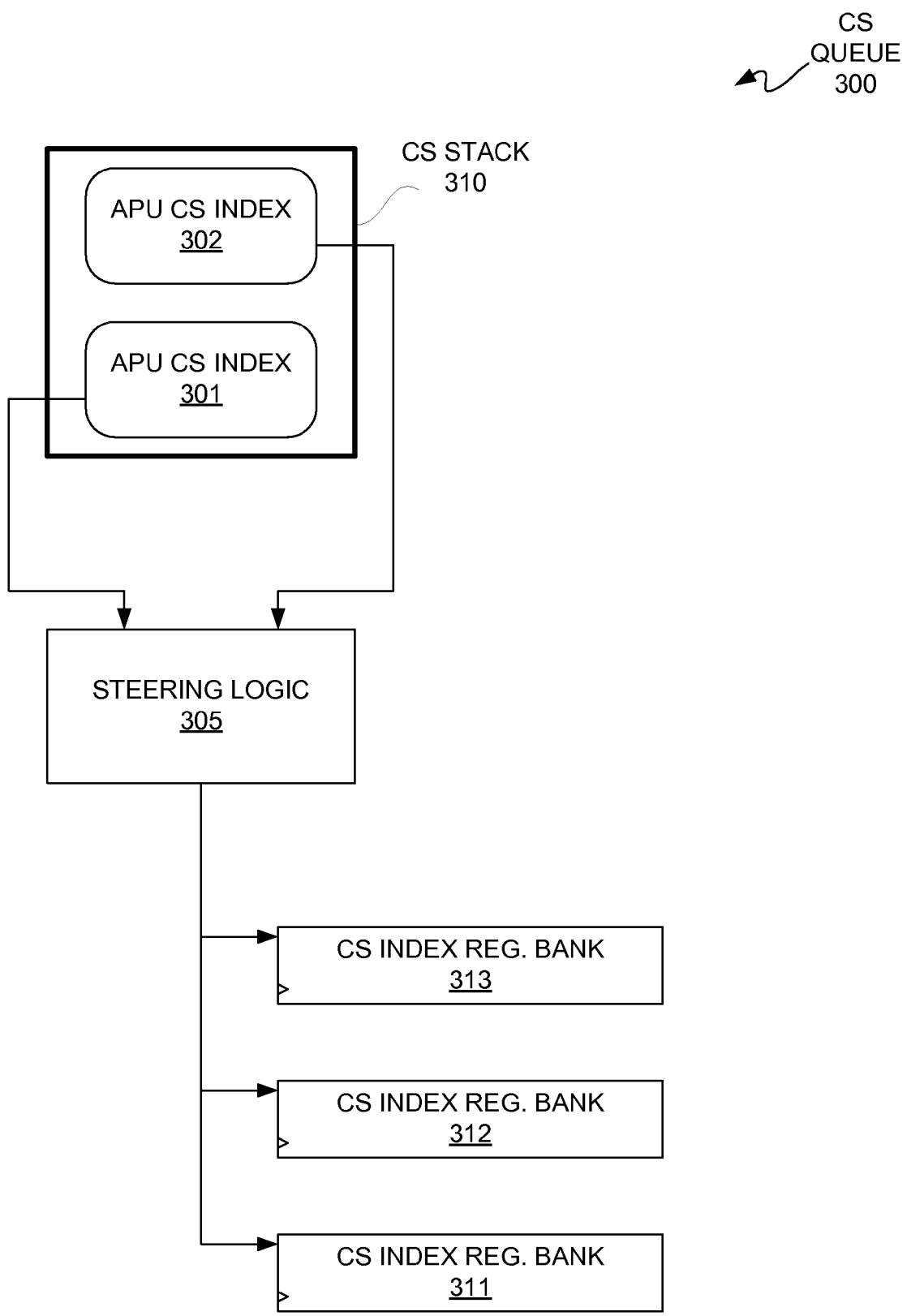
FIG. 5 is a block diagram depicting an exemplary embodiment of an index queue of a fabric coprocessor module queue of FIG. 2.

FIG. 5 is a block diagram depicting an exemplary embodiment of an index queue 300. Index queue 300 is another queue of FCM queue 610. Indexing queue 300 is coupled to receive APU current state indices, such as APU CS indices 301 and 302. Each instruction in FCM queue 610 may be assigned a CS index number to uniquely identify such instruction within FCM queue 610.

APU CS indices are provided to steering logic 305 in the order in which they are received, namely the order in which APU instructions 201 and 202 that respectively correspond to APU CS indices 301 and 302 are received. Steering logic 305 assigns each CS index to a respective CS index register bank of CS register index bank 311 through 313. CS index register banks 311 through 313 respectively correspond to FCM register banks 211 through 213. Thus for example an instruction stored in FCM register bank 211 has its CS index stored in CS index register bank 311. Steering logic 305 assigns each APU CS index to a CS index register bank of CS index register banks 311 through 313 to a lowest available register bank, just as previously described with reference to assignment of APU instructions by steering logic 205.

A CS index may be used to match up an instruction in FCM queue 610 to an instruction in I-pipe 701 or L-pipe 702. Once a match is found, FCM queue 610 may correctly associate source operands for an instruction. Continuing the above example of a PowerPC for microprocessor 700, in general purpose resources in such microprocessor, operation codes or op-codes may specify an instruction and location of a source operand or operands for such instruction. For a PowerPC, Ra and Rb are registers that may be used for source operands for an instruction and either or both may be specified.

Thus once a match is made by FCM queue 610 as between a CS index and an associated APU instruction, FCM queue 610 may associate such APU instruction with associated source data, whether from Ra or Rb or both, with such instruction. For example, writeback okay information, load data, and load byte address information, may be associated with a load instruction.

Figure 6:
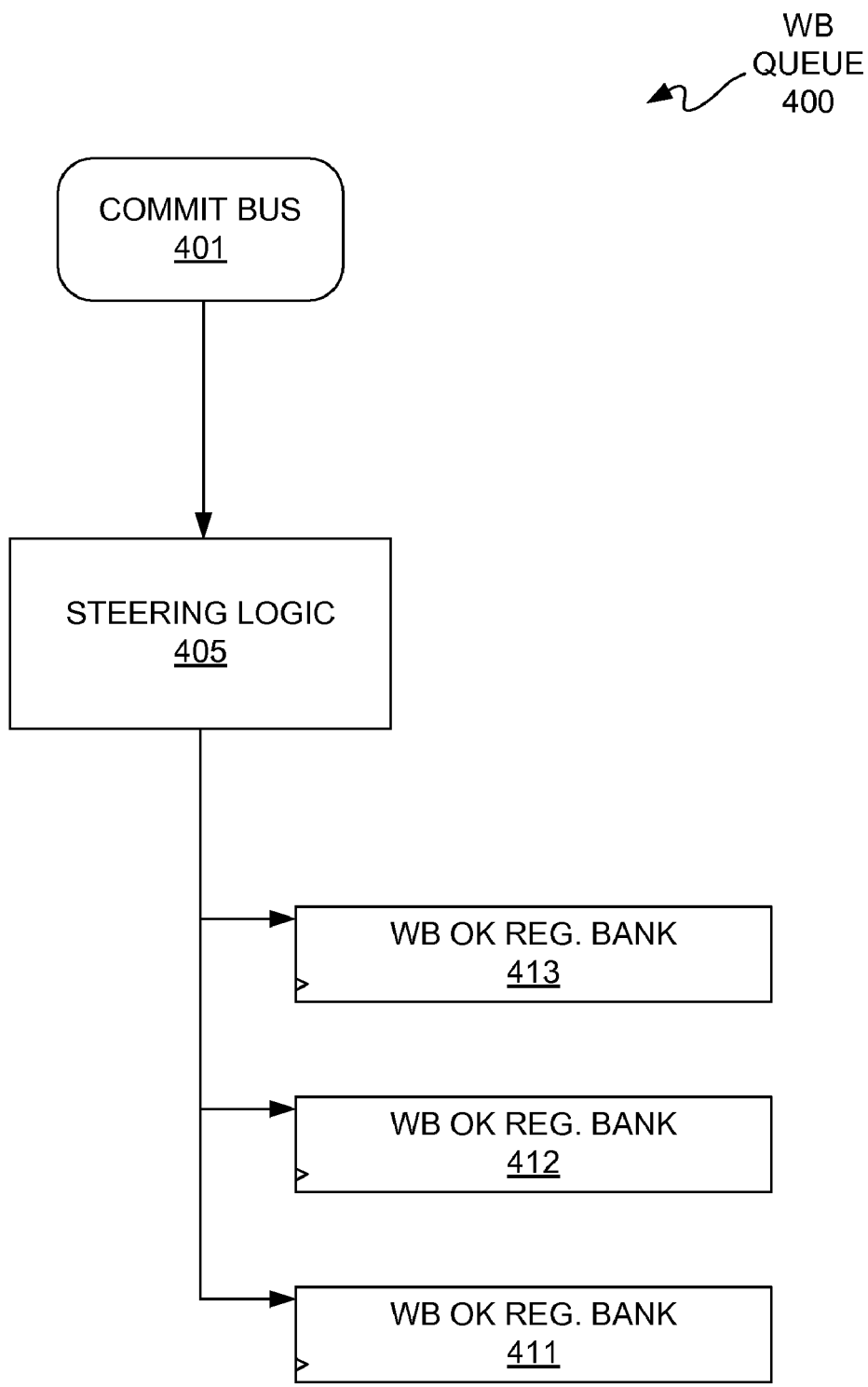
FIG. 6 is a block diagram depicting an exemplary embodiment of a writeback queue of a fabric coprocessor module queue of FIG. 2.
Figure 7:
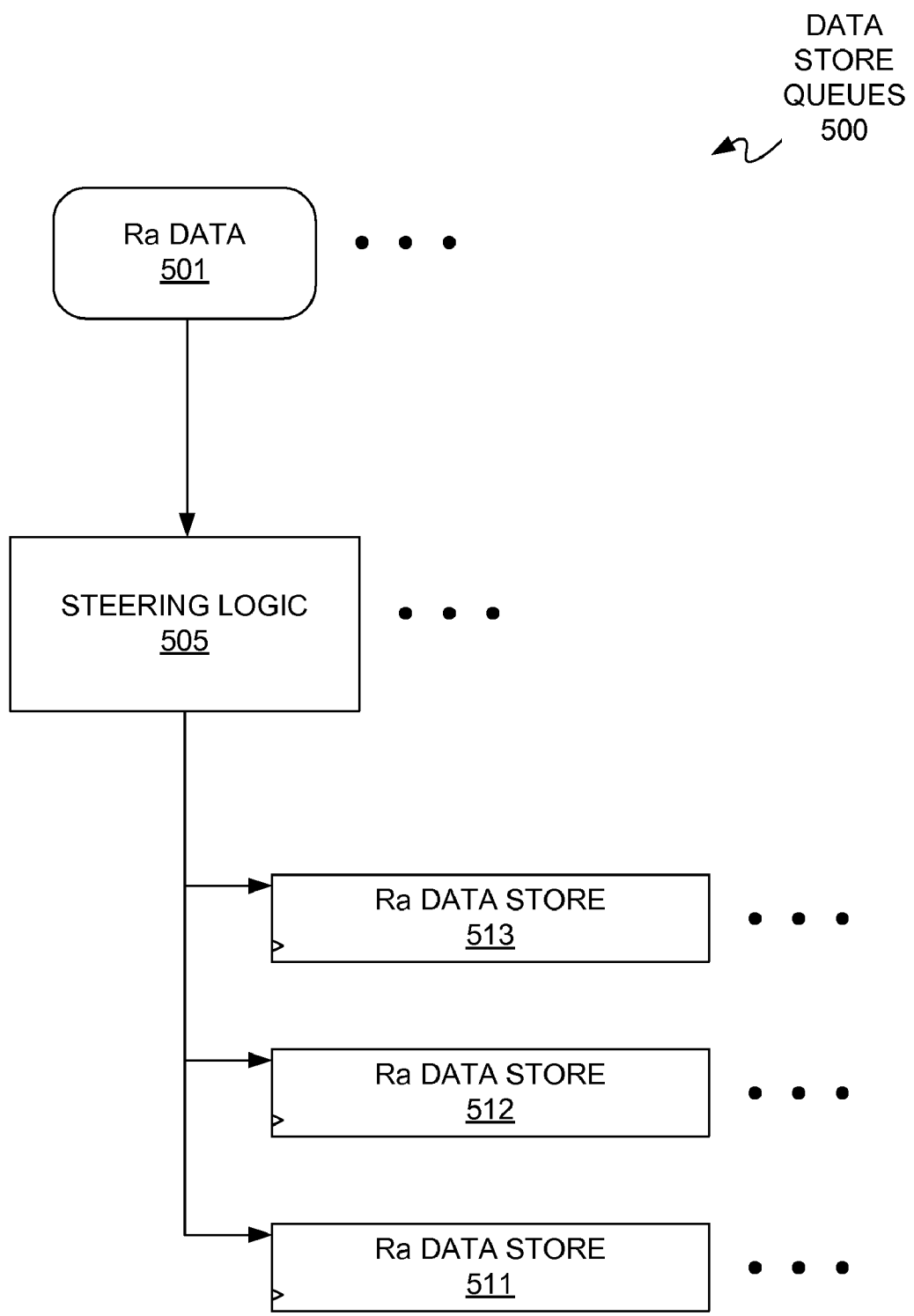
FIG. 7 is a block diagram depicting an exemplary embodiment of data store queues of a fabric coprocessor module queue of FIG. 2.

FCM queue 610 as previously described includes instruction queue 200 of FIG. 4, CS queue 300 of FIG. 5, writeback ("WB") queue 400 of FIG. 6, as well as data store queues 500 of FIG. 7.

With reference to FIG. 6, there is shown a block diagram depicting an exemplary embodiment of a WB queue 400. A commit bus 401 from microprocessor 700 is provided to steering logic 405. Commit bus 401 indicates whether an instruction has been committed for purposes of execution. Steering logic 405 assigns each received commit bus 401, again where a bus indicates a group of signals, to a WB okay register bank of register banks 411 through 413.

Each such commit bus 401 received for an instruction is assigned to a register bank of register banks 411 through 413 corresponding to where such instruction and associated CS index is respectively assigned in instruction queue 200 and CS queue 300. Thus, again for example if a commit bus 401 is assigned to WB okay register bank 411, then the APU instruction for such commit bus 401 may have been assigned to FCM register bank 211.

With reference to FIG. 7, where there is shown a block diagram depicting an exemplary embodiment of data store queues 500, source operands for an associated APU instruction are assigned a register bank corresponding to where such APU instruction is assigned. In this example, Ra data from an execution pipeline stage of I-pipe 701 is illustratively shown. It should be appreciated that Rb data may be provided from microprocessor 700 from such execution stage for a PowerPC, and thus a separate Rb queue just like the Ra data store queue illustratively shown may be used. Furthermore, it should be appreciated that there may be multiple instances of various data stores as generally indicated in FIG. 7.

Ra data 501 is steered by steering logic 505 to store in an appropriate Ra data store of Ra data stores 511 through 513. Again, Ra data stores respectively correspond to registers banks described with reference to FIGS. 4 through 6 and an instruction for example stored in FCM register bank 211 may have its corresponding Ra data, if any, stored in Ra data store 511.

Returning to FIG. 2, as instructions are received by microprocessor 700, some of which may be for coprocessor 602 as generally indicated as APU instructions, such instructions are passed to FCM queue 610 along with corresponding information. FCM queue 610 is controlled by state machine 611. However, information going back from coprocessor 602 is not provided to FCM queue 610, but rather is provided to transaction queue 613. Transaction queue 613 is controlled by state machine 612, and transaction queue 613 and state machine 612 may both be part of APU controller 600. APU controller 600 may be hardwired dedicated circuitry of processor block 110.

Continuing the above example for purposes of clarity and not limitation, it shall be assumed that instruction queue 200 of APU controller 600 may track up to three valid instructions at a time. Transaction queue 613 tracks instructions and associated CS indices, commit values, and any non-autonomous data or decoded signals associated therewith. Transaction queue 613 tracks instructions for the entirety of the time which such instruction are within APU controller 600. Transaction queue 613 includes instruction queue 800 of FIG. 8, CS queue 900 of FIG. 9, WB queue 1000 of FIG. 10, and data stores queues 1100 of FIG. 11.

Autonomous instructions are considered complete when an associated transaction therefor is completed for example by coprocessor 602 or some other slave device instantiated in FPGA fabric 603. For a PowerPC implementation, non-autonomous instructions remain in APU controller 600 for at least one PowerPC clock cycle longer than completed autonomous instructions. This additional cycle or cycles is for such instructions to return back data to the PowerPC, in this example to microprocessor 700 which may be a PowerPC, or more particularly to a WB or load WB ("LWB") pipeline stage of a pipeline thereof.

APU instructions enter transaction queue 613 when issued for example from a DISS0 or DISS1 buffer. APU instructions enter transaction queue 613 in order, but may or may not be removed from transaction queue 613 in order. It should be appreciated that APU instructions entering FCM queue 610 are pushed on in order and popped off of as those instructions are ready to be processed by coprocessor 602. Such instructions also enter transaction queue 613 when they enter FCM queue 610, namely instructions are popped on transaction queue 613 in the same order as they are popped on FCM queue 610. However, transaction queue 613 hangs onto such instructions until completed by coprocessor 602.

Thus, an APU instruction popped off of FCM queue 610 having been pushed onto transaction queue 613 may still be in transaction queue 613 even though it is no longer in FCM queue 610. APU instructions may be removed from transaction queue 613 in any of several ways: when coprocessor 602 completes a transaction for an autonomous transaction; when a non-autonomous instruction has been completed by coprocessor 602 and is currently in a WB or LWB pipe stage of a pipeline of microprocessor 700 with no pipeline holds; or when one or more instructions is flushed due to a branch miss prediction, a pipeline flush issued by microprocessor 700, or an exception generated by coprocessor 602.

Transaction queue 613 uses state machine 612 to track how many instructions are currently in transaction queue 613. Queued information in transaction queue includes APU instructions CS indices associated with such instructions, and any result data obtained for such instructions, among other queued information. Queued information in transaction queue 613 may be used by state machine 612 along with other inputs (not shown for purposes of clarity and not limitation) to track data in transaction queue 613.

Figure 8:
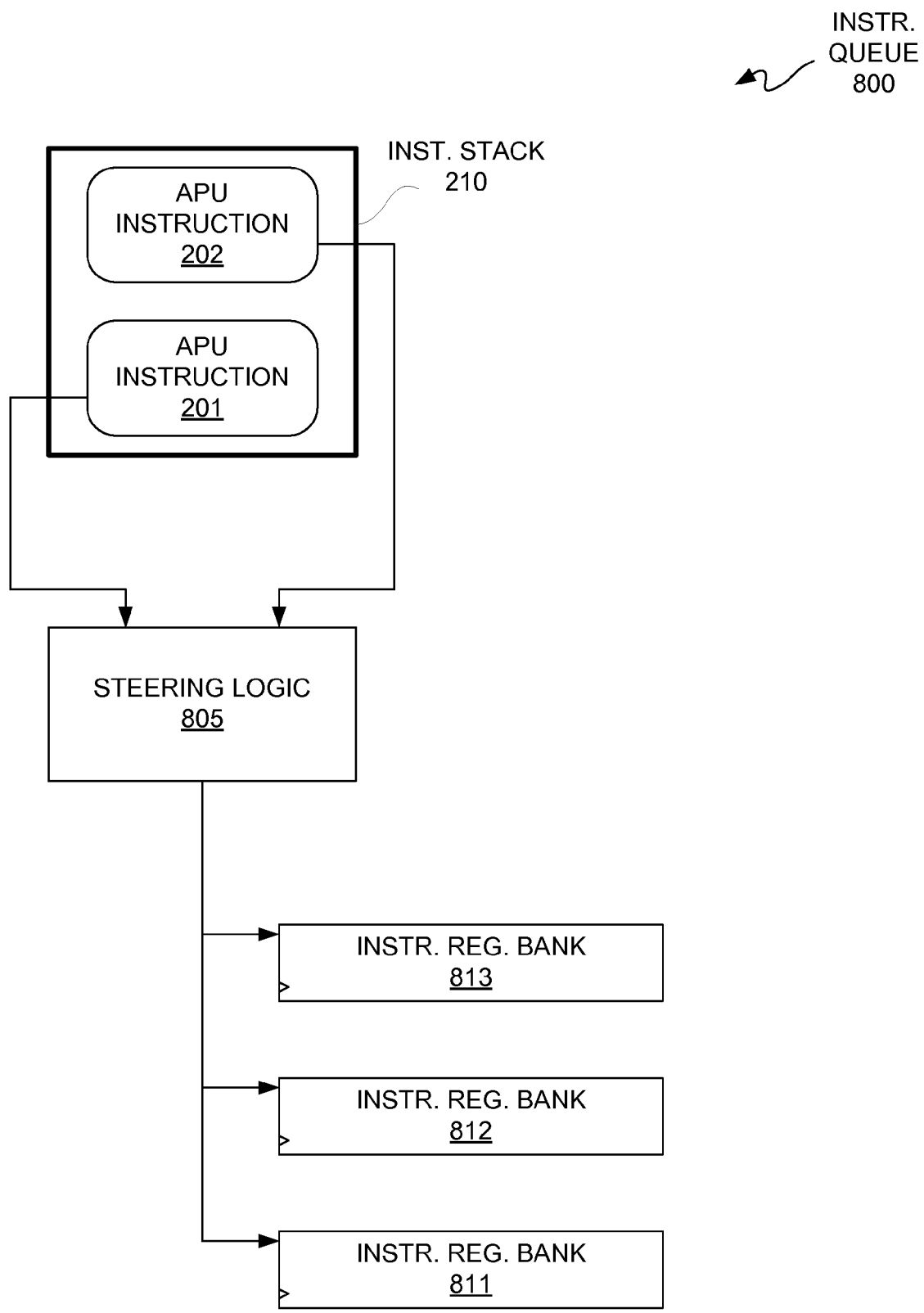
FIG. 8 is a block diagram depicting an exemplary embodiment of an instruction queue for a transaction queue of FIG. 2.

FIG. 8 is a block diagram depicting an exemplary embodiment of an instruction queue 800 for transaction queue 613 of FIG. 2. As previously described instruction stack 210 may be used to provide APU instructions 201 and 202. Such instructions may be provided to steering logic 805, which may be configured the same as steering logic 205 of FIG. 2. Moreover, instruction register banks 811 through 813 may be configured same as FCM register banks 211 through 213 of FIG. 2, and the information stored in instruction register banks 811 through 813 may at instances of time be the same as that stored in FCM register banks 211 through 213, or as previously indicated such information may be present in transaction queue 613 but may have been popped off FCM queue 610. Again, just because an instruction exists in transaction queue 613, it does not mean that such instruction is still in FCM queue 610.

Figure 9:
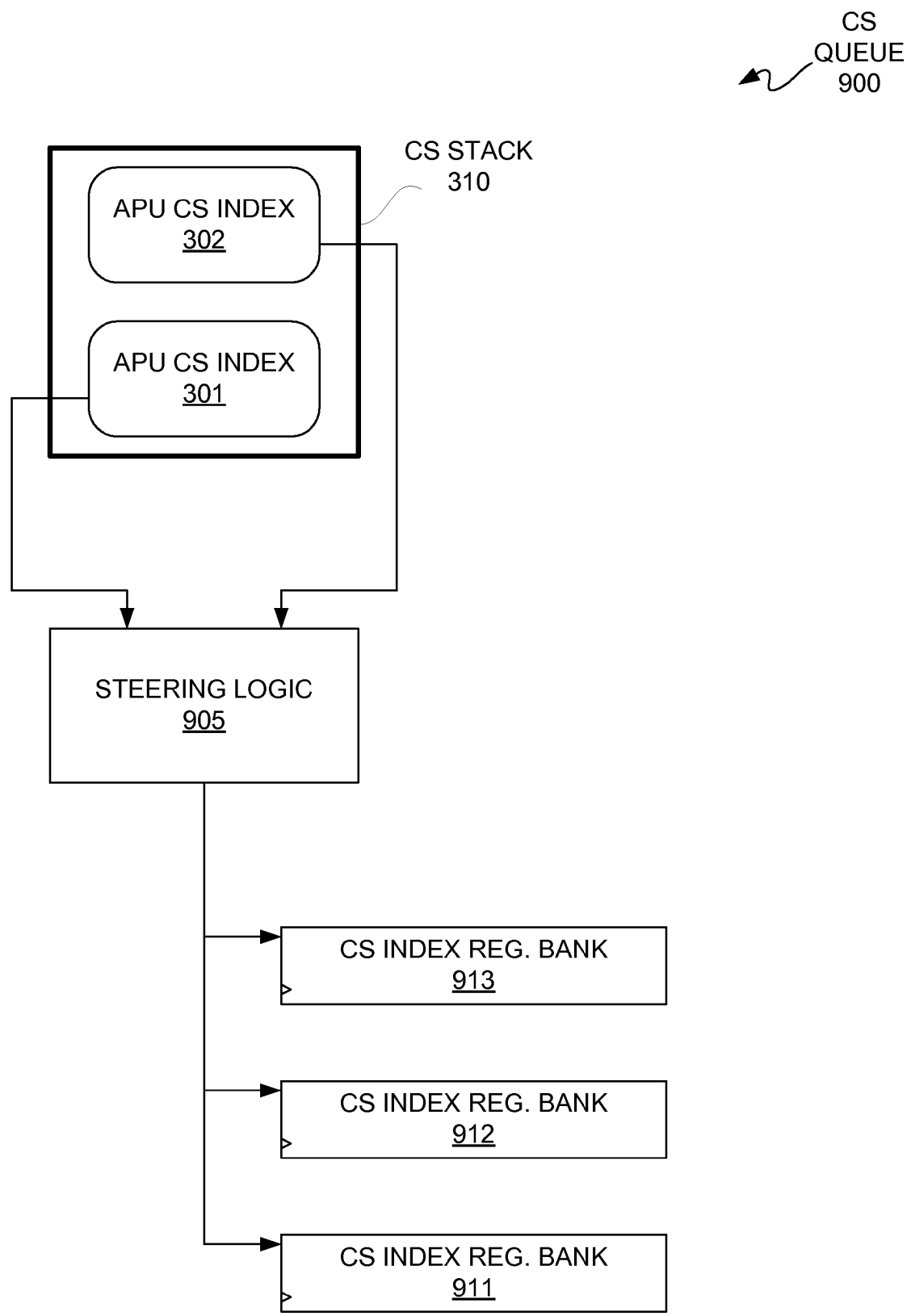
FIG. 9 is a block diagram depicting an exemplary embodiment of an index queue of a transaction queue of FIG. 2.

FIG. 9 is a block diagram depicting an exemplary embodiment of CS queue 900 of transaction queue 613 of FIG. 2. CS stack 310 includes APU CS indices 301 and 302 respectively associated with APU instructions 201 and 202 as previously described. APU CS indices 301 and 302 may be provided in order to steering logic 905, which may be configured the same as steering logic 305 of FIG. 5. Likewise, CS index register banks 911 through 913 coupled to steering logic 905 may be configured the same as CS index register banks 311 through 313. It should be appreciated that CS index register banks 911 through 913 correspond to instruction register banks 811 through 813. Thus instructions stored in any of instruction register banks 811 through 813 have a corresponding CS index in a corresponding CS index register bank of CS index register banks 911 through 913. Again, steering logic 805 and 905 is configured to place each incoming instruction in a lowest order available register bank position for subsequent processing.

Figure 10:
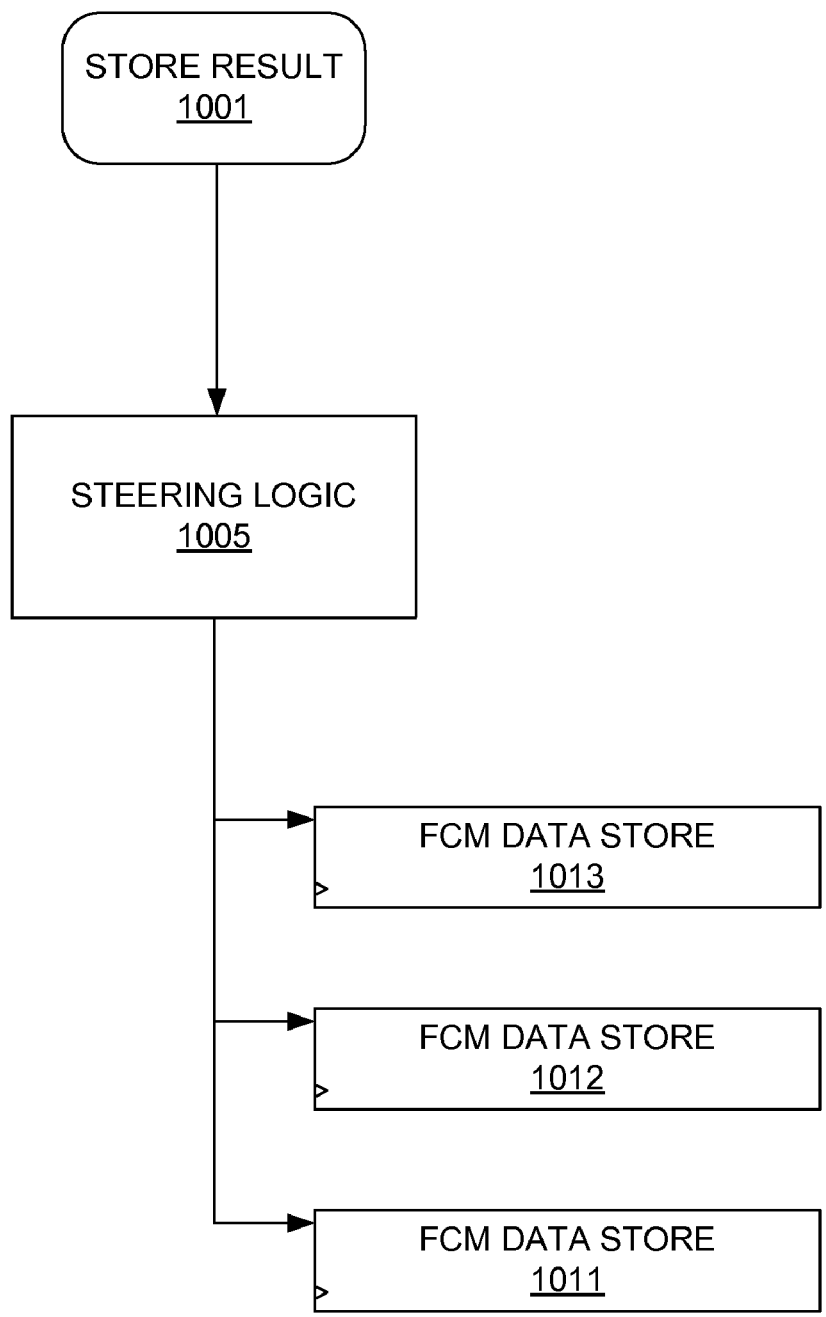
FIG. 10 is a block diagram depicting an exemplary embodiment of a writeback queue of a transaction queue of FIG. 2.

FIG. 10 is a block diagram depicting an exemplary embodiment of a WB queue 1000. Store result input from for example coprocessor 602 is provided as generally indicated as store result 1001. Store result 1001 is provided to steering logic 1005 for steering to one of FCM data stores 1011 through 1013. Data stores 1011 through 1013 correspond to instruction register banks 811 through 813 and 911 through 913, respectively. Thus for example if a store result 1001 is for an executed instruction stored in instruction register bank 811 having a CS index stored in CS index register bank 911, then such resultant data from coprocessor 602 is stored in FCM data store 1011.

It should be appreciated that store result 1001 is only in response to a store operation. Thus for example if a store instruction is stored in instruction register bank 811, then store result 1001 for such instruction would be stored in FCM data store 1011. However, if the instruction stored in instruction register bank 811 was a load instruction for example, then there would be no returning store result 1001 for such instruction, and accordingly FCM data store 1011 in this example would be empty.

Figure 11:
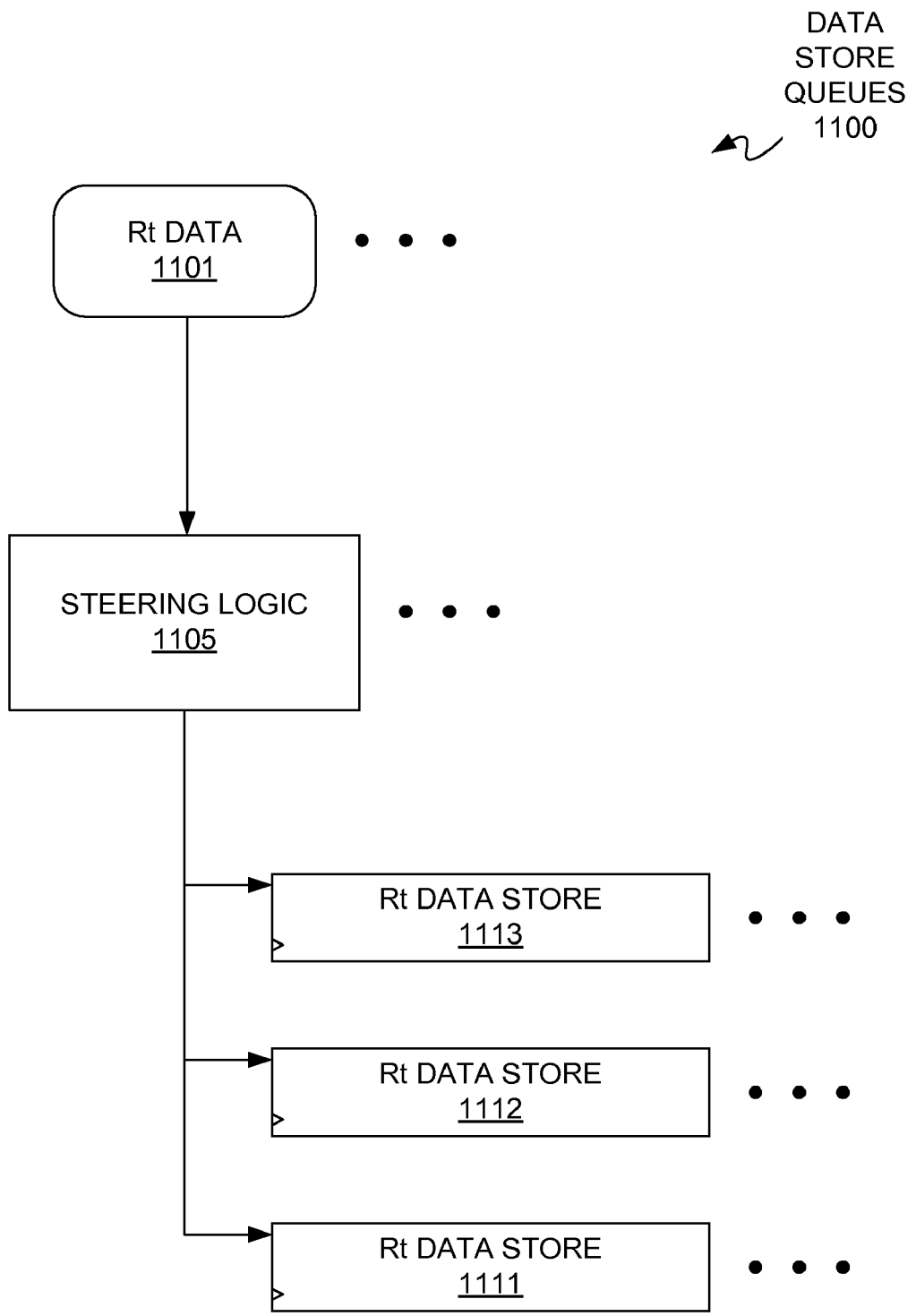
FIG. 11 is a block diagram depicting an exemplary embodiment of data store queues of a transaction queue of FIG. 2.

FIG. 11 is a block diagram depicting an exemplary embodiment of data store queues 1100. Data store queues 1100 are part of transaction queue 613. It should be appreciated that there may be multiple forms of resultant data for different registers.

With continuing reference to FIG. 11, it should be appreciated that there may be multiple general purpose registers of microprocessor 700. Thus, the fact that the example of return result data for such general purpose registers is illustratively shown is not meant to preclude that other register data may be provided back to microprocessor 700 as a result of an instruction.

In this example Rt data 1101 is provided to steering logic 1105 which steers such data to the appropriate Rt data store of Rt data stores 1111 through 1113. Return Rt data stores 1111 through 1113 respectively correspond to instruction register banks 811 through 813. Thus, if an instruction in instruction bank 811 for example includes as part of its execution a return of result data for an Rt general purpose register of microprocessor 700, such returned Rt data 1101 may be put in Rt data store 1111.

With simultaneous reference to FIGS. 2 and 8 through 11, as each APU instruction enters transaction queue 613, such instruction, as well as all non-autonomous decoded information and a CS index number therefor are registered. Each APU instruction in transaction queue 613 has a CS index number which is unique for the purposes described herein associated with such instruction. This CS index, which is described with reference to FIG. 9, is used to match up an APU instruction in instruction register bank to a corresponding instruction in I-pipe 701 or L-pipe 702. For example, if in FCM register bank 211 there is an instruction, then there is a CS index uniquely identifying such instruction for purposes described herein in CS index register bank 311.

Matching of CS indices is useful because for example a load instruction may stall in a load writeback stage of L-pipe 702, such as due to a cache read miss, a load or store instruction behind such load instruction may likewise be stalled. If another instruction is executed in I-pipe 701 and completes prior to the load/store instruction which is behind a stalled instruction in L-pipe 702, it is possible that the completed instruction in I-pipe 701 will have executed before a previously received instruction in L-pipe 702. In other words, instructions may enter microprocessor 700 and queues 610 and 613 in order, but such instructions may not necessarily exit microprocessor 700 and thus transaction queue 613 in the order in which they were received.

However, the instruction in instruction register bank 811 may have a CS index stored in CS index register bank 911 which is different from the CS index stored in CS index register bank 311. This may happen because the instruction previously in FCM queue 610 having the CS index now stored in CS index register bank 911 may have been popped off of FCM queue 610, and a new instruction and a corresponding new CS index for such instruction may have been stored in FCM register bank 211 and CS index register bank 311, respectively.

Again, it should be appreciated that transaction queue 613 queues instructions and associated information which are still subject to control by APU controller 600. FCM queue 610 once it issues an instruction to APU interface 601 for coprocessor 602 and such instruction completes within FCM queue 610 as indicated by FCM queue 610 issuing a done signal, FCM queue 610 no longer includes such instruction even though such instruction may not have completed and thus is still subject to control by APU controller 600, namely within transaction queue 613. Thus, the CS index stored in for example CS index register bank 911 may be used to match up the corresponding instruction in a pipeline of microprocessor 700 even though such instruction is no longer in FCM queue 610. Additionally, an instruction may be removed from FCM queue 610 responsive to a flush command.

Once a match is found using a CS index, transaction queue 613 may associate result data with the instruction therefore. In addition to result data, there may be condition register data, which may be associated by CS index. Additionally store data may be associated using CS indices.

Accordingly, it should be appreciated that even though APU interface 601 is configured for executing one transaction at a time in order, out of order execution by microprocessor 700 is supported. Additionally, transactions may be processed back-to-back, namely with zero cycle latency between transactions by piping as described with reference to FCM queue 610. Instructions in FCM queue 610 may be popped off that queue out of order in the event that the instruction popped off out of order is no longer going to be sent to co-processor 602. In other words, such an out of order popped off instruction is not going to be executed. Instructions in transaction queue 613 may be popped off out of order if: the instruction popped off is not going to be sent to co-processor 602; or after co-processor 602 has completed the execution of the instruction, the instruction then finishes in microprocessor 700 out of order.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for supporting out of order execution of instructions, comprising:
    coupling a microprocessor to a coprocessor via a controller;
    receiving instructions by the microprocessor and the controller;
    generating by the microprocessor indices respectively associated with the instructions;
    the controller including a first queue and a second queue;
    first queuing the instructions and the indices in the first queue;
    the first queuing including steering the instructions and the indices associated therewith to respective first register locations while maintaining association between the instructions and the indices;
    popping the instructions from the first queue for execution by the coprocessor; and
    selectively popping off the instructions from the first queue out of order with respect to an order in which the instructions are received into the first queue,
    wherein the first queuing including steering the instructions and the indices associated therewith comprises:
        steering the instructions to first registers of the first register locations; and
        steering the indices to second registers of the first register locations;
        wherein the first registers and the second registers respectively correspond to one another such that a first position in the first registers is the first position in the second registers, and a second position in the first registers is the second position in the second registers.

2. The method according to claim 1 further comprising:
    second queuing the instructions and the indices in the second queue;
    monitoring completion status of the instructions with respect to execution by the coprocessor;
    popping off the instructions from the second queue responsive to order of completion by the coprocessor; and
    the order of completion of the instructions allowed to be out of order with respect to the order in which the instructions are received into the second queue.

3. The method according to claim 2, wherein the microprocessor includes a plurality of pipelines for piping the instructions in parallel.

4. The method according to claim 3, further comprising:
    committing by the microprocessor the instructions in an order in which the instructions are received by the microprocessor; and
    executing the instructions by the coprocessor in the order in which the instructions are received by the microprocessor.

5. The method according to claim 2, wherein the second queuing including steering the instructions and the indices associated therewith to respective second register locations while maintaining association between the instructions and the indices.

6. The method according to claim 5, wherein the second queue includes steering logic configured to steer:
    the instructions to first registers of the second register locations;
    the indices to second registers of the second register locations;

writeback information respectively associated with the instructions to third registers of the second register locations; and data respectively associated with the instructions to fourth registers of the second register locations.

7. The method according to claim 1, further comprising:

completing execution of a first instruction of the instructions by the coprocessor; and sending a second instruction of the instructions from the first queue to the coprocessor without any clock cycle latency between completing execution of the first instruction and the sending of the second instruction.

8. The method according to claim 1, wherein the first queuing including steering the instructions and the indices associated therewith further comprises:

steering writeback information respectively associated with the instructions to third registers of the first register locations; and steering data respectively associated with the instructions to fourth registers of the first register locations.

9. The method according to claim 8, wherein the first registers, the second registers, the third registers, and the fourth registers respectively correspond to one another such that the first position in the first registers is the first position in each of the second registers, the third registers, and the fourth registers and that the second position in the first registers is the second position in each of the second registers, the third registers, and the fourth registers.

10. A controller for bridging a microprocessor and a coprocessor, the controller comprising:

a first queue and a second queue for receiving instructions provided to the microprocessor and for receiving indices generated by the microprocessor for the instructions received;

the first queue under first state machine control configured to:

steer the instructions and the indices associated therewith to respective first register locations while maintaining association between the instructions and the indices;

pop the instructions from the first queue for execution by the coprocessor; and support the instructions being popped off the first queue out of order with respect to an order in which the instructions are received into the first queue, wherein the first queue includes a steering circuit configured to steer:

the instructions to first registers of the first register locations; and the indices to second registers of the first register locations;

wherein the first registers and the second registers respectively correspond to one another such that a first position in the first registers is the first position in the second registers, and a second position in the first registers is the second position in the second registers.

11. The controller according to claim 10, wherein the second queue under second state machine control is configured to:

monitor completion status of the instructions with respect to execution by the coprocessor;

pop off the instructions from the second queue responsive to order of completion by the coprocessor; and support the order of completion of the instructions including when out of order with respect to the order in which the instructions are received into the second queue.

12. The controller according to claim 11, wherein the microprocessor includes a plurality of pipelines for piping the instructions in parallel.

13. The controller according to claim 11, wherein the steering circuit is further configured to steer:

writeback information respectively associated with the instructions to third registers of the first register locations; and data respectively associated with the instructions to fourth registers of the first register locations.

14. The controller according to claim 13, wherein the first registers, the second registers, the third registers, and the fourth registers respectively correspond to one another such that the first position in the first registers is the first position in each of the second registers, the third registers, and the fourth registers and that the second position in the first registers is the second position in each of the second registers, the third registers, and the fourth registers.

15. The controller according to claim 11, wherein the second queue under the second state machine control is configured to steer the instructions and the indices associated therewith to respective second register locations while maintaining association between the instructions and the indices.

16. The controller according to claim 15, wherein the second queue includes another steering circuit configured to steer:

the instructions to first registers of the second register locations;

the indices to second registers of the second register locations;

writeback information respectively associated with the instructions to third registers of the second register locations; and data respectively associated with the instructions to fourth registers of the second register locations.

* * * * *